(12) United States Patent
Kwan

(10) Patent No.: US 7,998,444 B2
(45) Date of Patent: Aug. 16, 2011

(54) METHOD OF REDUCING NITROGEN OXIDES IN A GAS STREAM WITH VAPORIZED AMMONIA

(75) Inventor: Yul Kwan, Corona, CA (US)

(73) Assignee: Johnson Matthey Inc., Wayne, PA (US)

( * ) Notice: Subject to any disclaimer, the term of this patent is extended or adjusted under 35 U.S.C. 154(b) by 0 days.

(21) Appl. No.: 12/150,940

(22) Filed: Apr. 30, 2008

(65) Prior Publication Data
US 2009/0274601 A1    Nov. 5, 2009

(51) Int. Cl.
*B01D 53/56* (2006.01)
*C01B 21/02* (2006.01)
(52) U.S. Cl. ..................... 423/235; 423/239.1
(58) Field of Classification Search ............... 423/210, 423/212, 235, 239.1, 360
See application file for complete search history.

(56) References Cited

U.S. PATENT DOCUMENTS
2008/0196763 A1* 8/2008 Gretta et al. .................... 137/4

OTHER PUBLICATIONS
Kohl et al. "Gas Purification", 1997, 5th Ed. p. 894-922.*

* cited by examiner

*Primary Examiner* — W. Langel
*Assistant Examiner* — Syed Iqbal
(74) *Attorney, Agent, or Firm* — RatnerPrestia

(57) ABSTRACT

The present invention is a method for selective reduction of nitrogen oxides in a gas stream with ammonia wherein the ammonia is vaporized prior to contacting it with the carrying fluid. The present invention also comprises a reducing agent dispersion system for use in substantially uniformly mixing a reducing agent with nitrogen oxides in a flue gas stream comprising a header and a plurality of lances. Further, the present invention comprises a novel reactor design for use in selective reduction of nitrogen oxides in a gas stream.

14 Claims, 5 Drawing Sheets

Schematic of Aqua Ammonia Vaporization Process

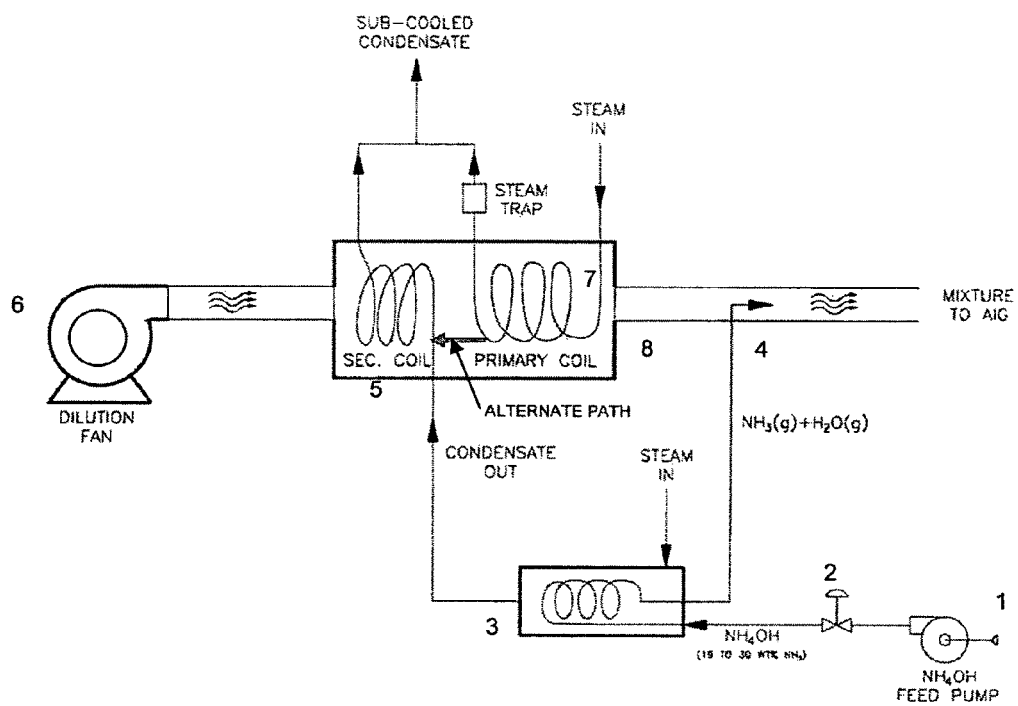
Figure 1. Schematic of Aqua Ammonia Vaporization Process

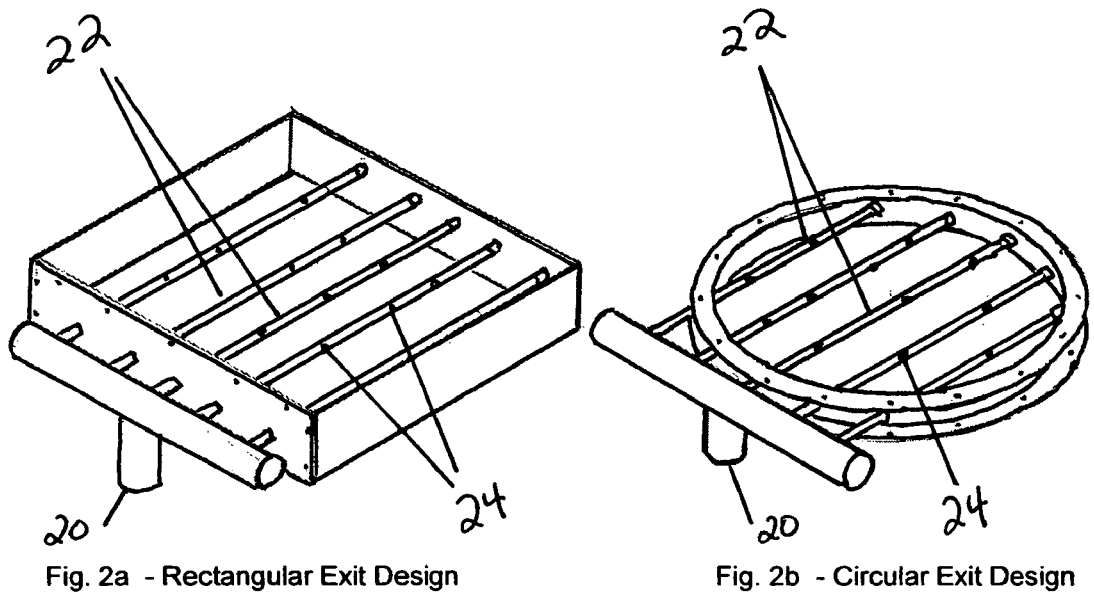
Fig. 2a - Rectangular Exit Design
Fig. 2b - Circular Exit Design
Figure 2 - RADG

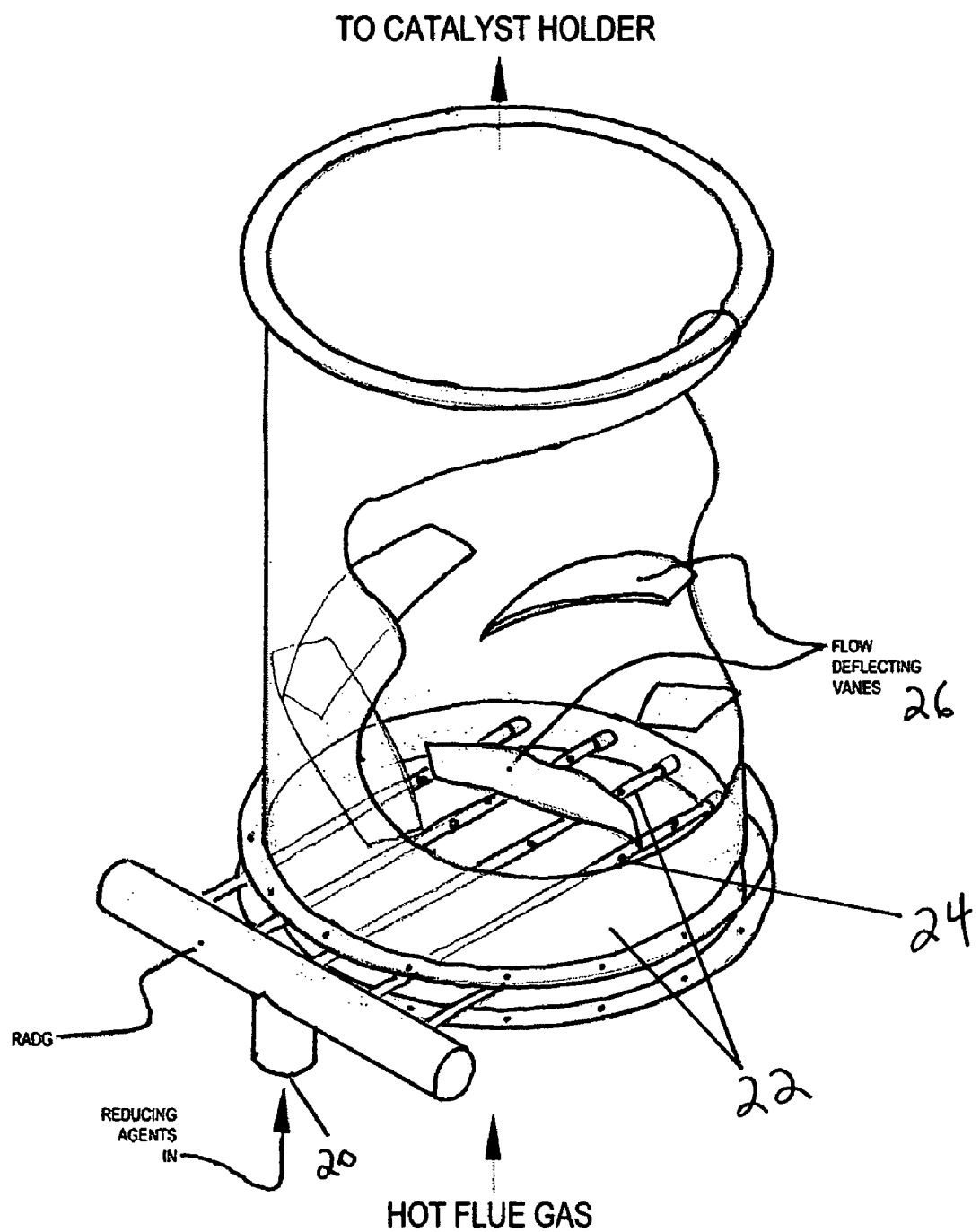
Figure 3. Mixing Duct

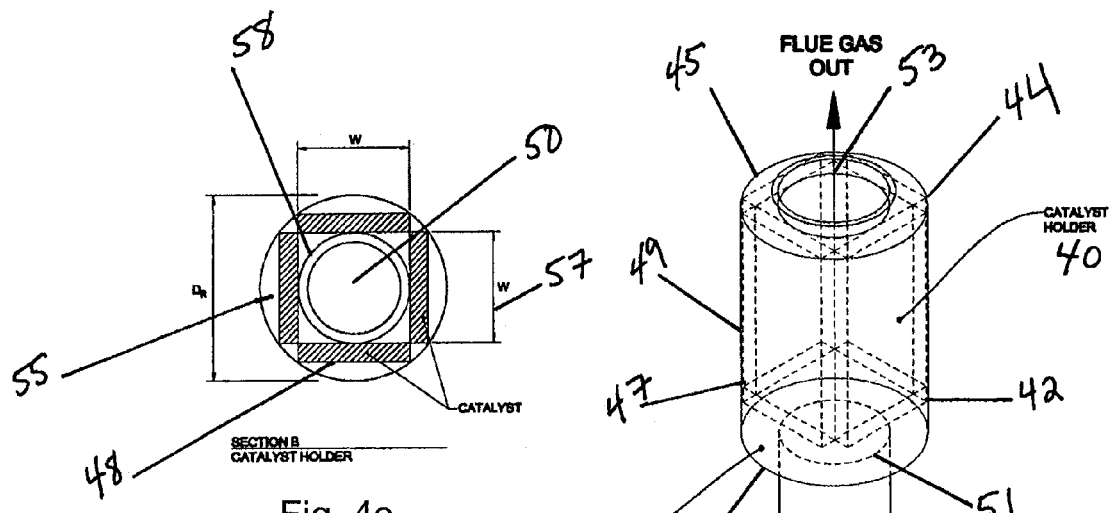
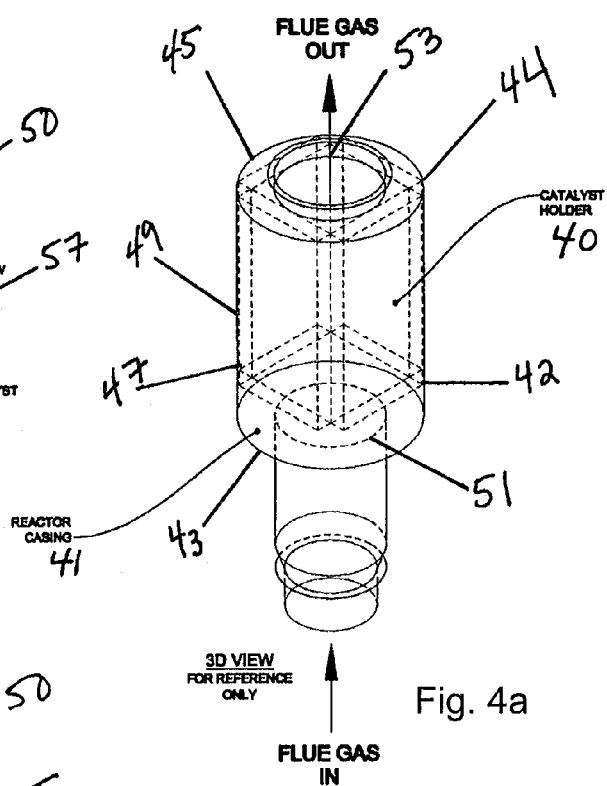
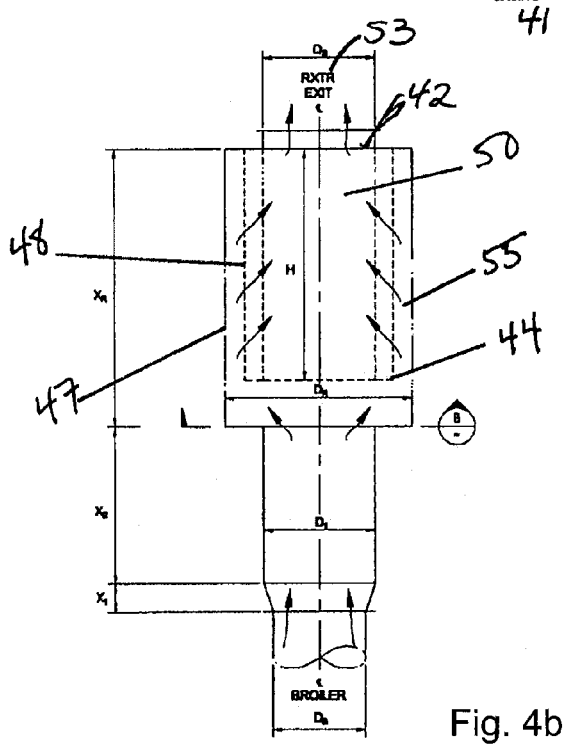
Fig. 4c
Fig. 4a
Fig. 4b

METHOD OF REDUCING NITROGEN OXIDES IN A GAS STREAM WITH VAPORIZED AMMONIA

FIELD OF THE INVENTION

The invention is a method of reducing nitrogen oxides ($NO_x$) in a gas stream with a reducing agent, preferably vaporized ammonia. The invention additionally comprises a reducing agent dispersion system and novel reactor design.

BACKGROUND

Combustion products and effluents resulting from the burning of fossil fuels due to either natural causes or from a variety of man-made devices contain various by-products. The majority of these by-products have been identified and classified by environmental regulatory agencies around the world as major sources of air pollution. Pollutants of particular concern found in the combustion products are NO and $NO_2$ (collectively referred to as $NO_x$ or nitrogen oxides).

Various post-combustion methods have been developed and have been applied to reduce the emissions of $NO_x$. Of these methods, Selective Catalytic Reduction (SCR) and Selective Non-Catalytic Reduction (SNCR) are the most commonly practiced. However, both methods require the addition of a reducing agent(s) to assist in the conversion of $NO_x$ into benign compounds. Presently, the most commonly used reducing agent is ammonia ($NH_3$) in any of its many forms. Unless specified in this specification, ammonia refers generally to any form, including but not limited to ammonia and aqua ammonia.

The reduction of $NO_x$ into benign compounds is depicted in the following reactions:

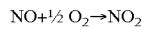

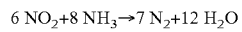

Ammonia is considered to be a toxic gas by environmental regulatory agencies. As the use of ammonia has become more widespread, a concern exists regarding the possibility of accidental leakage into the atmosphere, and as a result, new regulations have been implemented to limit the use of anhydrous ammonia (particularly in populated areas) and require that it be substituted with ammonium hydroxide ($NH_4OH$), commonly known as aqua ammonia or aqueous ammonia. Ammonium hydroxide refers to a solution of ammonia in water.

Ammonia concentration in ammonium hydroxide is standardized commercially at two levels, namely, about 29.4% and about 19% $NH_3$ by weight, referred to as 19% $NH_4OH$ or 29.4% $NH_4OH$. The boiling point of the 29.4% $NH_4OH$ solution is about 80° F. while the boiling point of the 19% $NH_4OH$ solution is about 118° F. Due to its relatively high boiling point temperature, the 19% by weight aqua ammonia has been preferred by U.S. regulatory agencies since it reduces the potential for accidental escape or release of ammonia gas into the atmosphere.

To ensure maximum uniformity of distribution and mixing of ammonia with the $NO_x$ in the flue gas stream, a boosting or carrying fluid is required in order to achieve the desired dispersion into the flue gas stream. The amount of carrying fluid used varies with specific application. The objective is to increase injection jet momentum and therefore, enhance mixing. Ambient air or a portion of the hot flue gas provided by the combustion equipment itself has commonly been used as the carrying fluid.

In the prior art system, ammonia is vaporized through the use of a vaporizer where the heat of vaporization is provided entirely by the sensible heat of the carrying fluid. In most cases, the amount of carrying fluid used to assist in the dispersion of the ammonia vapor could be several times the theoretical amount needed to heat and vaporize the ammonia.

When ambient air is used as the carrying fluid of choice, the preferred method to heat the air is by means of an electric heater. The total energy demand to heat the carrying fluid includes the heat of vaporization of the ammonia plus the sensible heat gained by the carrying fluid from ambient temperature to a final mixture temperature. The final mixture temperature must be kept above the dew point temperature of the mixture in order to avoid re-absorption of the ammonia vapor into the condensate.

A limitation of the prior art involves using the sensible heat of the carrying fluid to vaporize the ammonia. Since the heat capacity of a carrying fluid is directly related to the amount of carrying fluid required, two options are available: 1) increase the initial temperature of the carrying fluid to a level such that the final preheated air temperature prior to the introduction of ammonia would be high enough to provide the necessary temperature to vaporize the ammonia in a relatively short time, and/or 2) if the initial temperature of the carrying fluid cannot be raised sufficiently, increase the mass flow of the carrying fluid. Neither of these options is without disadvantages. Increasing the final temperature of the carrying fluid is costly since it requires the use of a larger and more costly electric heater. Increasing the mass of the carrying fluid has an adverse impact on the system by creating an increased pressure loss through both the electric heater and the vaporizer itself. Further, increasing the mass of the carrying fluid to aid in dispersing the reducing agent may also increase the costs of the system. If an electric heater is used to heat the carrying fluid, the size of the heater, in terms of both physical size and watt capacity, has to be increased accordingly in order to maintain the proper temperature for vaporization of the ammonia. Increasing the size of the heater results in a more expensive heater, including the control system and hardware, and also results in an increase in operating costs. Further, electric heaters are generally structured in a number of bundles of heating elements. A larger capacity heater normally requires more heating elements which in turn causes a higher pressure loss across the heater. In addition, increasing the mass of the carrying fluid requires a larger blower which itself is more costly and also requires more power to operate to satisfy the increase in pressure loss through the electric heater as well as the high volume of the carrying fluid. Therefore, a method is needed to provide for the vaporization of ammonia without any of the aforementioned drawbacks.

SUMMARY OF THE INVENTION

The present invention is a method for selective reduction of nitrogen oxides in a gas stream with ammonia wherein the ammonia is vaporized prior to contacting it with the carrying fluid. When using aqua ammonia in lieu of anhydrous ammonia, the $NH_4OH$ solution is converted to the gaseous state first and then mixed with the carrying fluid before it is dispersed into the flue gas stream.

The present invention comprises a reducing agent dispersion system for use in substantially uniformly mixing reducing agents and a flue gas stream comprising a header and a plurality of lances; wherein the header is coupled to the lances; wherein the header is adapted to receive the reducing agents and deliver the reducing agents to the lances; wherein the lances comprise at least one opening in a surface of the lances (preferably a plurality of openings in a plurality of lances); wherein the lances are adapted to receive the reducing agent from the header and distribute the reducing agent through the at least one opening.

The present invention is a reactor for use in reducing nitrogen oxides contained in flue gas comprising a catalyst holder wherein the catalyst holder comprises a first end, a second end, an interior wall, an exterior wall, and a center, wherein the first end is open, the second end is closed and the center is hollow; and a reactor casing, wherein the reactor casing comprises an inlet, an outlet, an inner wall, and an outer wall, wherein the inlet has an opening to allow flue gas to enter only or substantially only the center of the catalyst holder and the outlet has an opening to allow flue gas to exit the reactor; wherein the reactor casing surrounds the exterior wall of the catalyst holder and surrounds at least a portion of the first end and second end; wherein a space is present between the exterior wall of the catalyst holder and the inner wall of the reactor casing; wherein a plurality of catalyst elements form the interior wall and exterior wall of the catalyst holder and wherein at least one catalyst element comprises a plurality of channels; wherein the channels are positioned substantially perpendicular to a path for the flue gas.

The present invention also comprises another embodiment of the reactor described above. The reactor comprises a catalyst holder wherein the catalyst holder comprises a first end, a second end, an interior wall, an exterior wall, and a center, wherein the first end is closed, the second end is open and the center is hollow; and a reactor casing, wherein the reactor casing comprises an inlet, an outlet, an inner wall, and an outer wall, wherein the inlet has an opening to allow flue gas to enter a space between the exterior wall of the catalyst holder and the inner wall of the reactor casing and the outlet has an opening to allow flue gas to exit the reactor; wherein the reactor casing surrounds the exterior wall of the catalyst holder and surrounds a portion of the first end and second end; wherein a plurality of catalyst elements form the interior wall and exterior wall of the catalyst holder and wherein at least one catalyst element comprises a plurality of channels; wherein the channels are positioned perpendicular to a path for the flue gas; wherein the center of the catalyst holder is adapted to receive flue gas prior to exiting the reactor through the outlet.

The method of the present invention offers several advantages over the prior art. By avoiding the prior art method of using heated carrying fluid to vaporize ammonia and instead vaporizing the ammonia itself prior to mixing with the carrying fluid, a cost and energy savings are realized. Further, because the carrying fluid is not used to vaporize the ammonia, the heater size can be reduced, thus, resulting in space savings. The reducing agent dispersion system offers advantages over the prior art in that it helps to improve the mixing between a reducing agent and a flue gas stream. Finally, the novel reactor designs offer cost savings over the prior art reactor.

This specification refers to ammonia as the reducing agent but it is understood by one of ordinary skill in the art that other reducing agents could be used, for example, urea, without limitation.

BRIEF DESCRIPTION OF THE DRAWINGS

FIG. 1 is process flow of the ammonia vaporization process of the current invention.

FIG. 2a is an embodiment of a reducing agent dispersion system.

FIG. 2b is another embodiment of a reducing agent dispersion system.

FIG. 3 is a diagram of a cut-away of a mixing duct incorporating the reducing agent dispersion system of FIG. 2b and flow deflecting vanes.

FIG. 4a is partial cross-section of one embodiment of the reactor design of the current invention.

FIG. 4b is another embodiment of the reactor design of the current invention depicting a flue gas stream flow.

FIG. 4c is a cross-section of an embodiment of a catalyst holder utilized in the reactor design depicted in FIG. 4a and 4b.

DETAILED DESCRIPTION OF THE INVENTION

Vaporization of Ammonia

Figure 5:
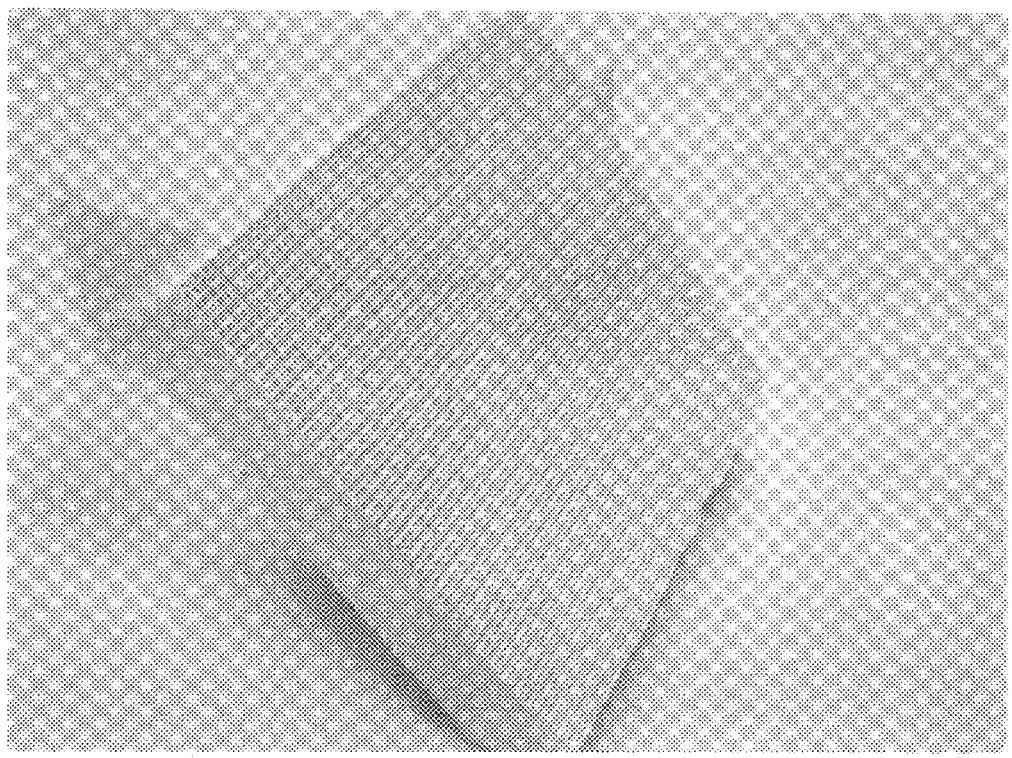
FIG. 5 is a photograph of an embodiment of the catalyst elements included in the reactor design of FIG. 4a and 4b.

In the present invention, various sources of heat can be used to heat and vaporize ammonia, preferably $NH_4OH$ indirectly, without mixing the ammonia with another stream which is the heat source. The heat source may include but is not limited to low pressure waste steam, hot flue gas, or any other source of gas or liquid from the job site that contains enough spare heat and has a minimum initial temperature of about 250° F., preferably about 280° F. to about 300° F. An electric heater can also be used to vaporize the ammonia. The ammonia concentration in the $NH_4OH$ can be about 10 to about 30% by weight. All percentages in this specification are by weight, unless specifically identified.

A process flow of the ammonia vaporization process according to the invention is depicted in FIG. 1. Ammonia, preferably $NH_4OH$, is fed to a heater from a feed pump (1) and the required flow may be regulated by a flow control valve (2). Ammonia is heated and converted into a vapor in a heater (3) which may take the form of a coil, plate or tube/shell heat exchanger or any other heat exchanger which is known in the art. Any of the heat sources noted above may be used. The ammonia vapor exits the heater (3) and discharges into the carrying fluid exit path through one or multiple sets of spargers, sprayers, or nozzles (4), where the ammonia vapor is dispersed into the carrying fluid stream and is subsequently mixed prior to reaching the ammonia injection grid (AIG) headers or manifolds. An ammonia injection grid is an embodiment of a reducing agent dispersion system. In a preferred embodiment, the $NH_4OH$ vapor may be in the form of water vapor mixed with $NH_3$ vapor.

The heater should be sized and engineered in such a way that the ammonia vapor exiting the heater is at a temperature above about 120° F., preferably in the range of about 200° F. to about 230° F. One of ordinary skill in the art would know how to design a heater to heat the vapor to the desired temperature, for example, without limitation, conventional heat exchangers can be used.

If low pressure or waste steam is readily available (for example, without limitation, in boiler applications), steam is a preferred source of heat. High pressure steam can also be used but is more costly. In a further embodiment of the invention, maximum energy utilization of waste steam can be made by re-directing the condensate produced from the ammonia vaporizing heater (3) to a secondary heat exchanger/coil (5) mounted in a carrying fluid casing (8) located at the exit of a carrier/dilution fan (6) to further heat the incoming carrying fluid prior to mixing with the ammonia vapor. This further ensures that the carrying fluid temperature remains sufficiently above the ammonia/carrying fluid mixture's dew point temperature in order to avoid condensation of the ammonia vapor. Additional steam coil or other auxiliary heating devices (7), such as but not limited to, an electric heating coil, may be incorporated in the carrying fluid casing to further boost the temperature of the carrying fluid should the specific location and/or certain weather conditions so require. Thus, multiple heat exchangers (in series or parallel) can be included in the invention.

When steam is used as the source of heat, the steam is condensed to provide near the maximum heat available for the vaporization of ammonia. Using the latent heat of vaporization of the steam to vaporize the ammonia significantly reduces the amount of steam required. Vaporizing the ammonia alone, before combining with the carrying fluid, allows for a reduction in the amount of carrying fluid required. The ratio of the amount of ammonia to the amount of carrying fluid varies because it is a function of the AIG (ammonia injection grid) and therefore varies depending upon the dispersion requirements. The table below provides a minimum mass ratio of $NH_4OH$ to the carrying fluid to fulfill the heat energy requirement only of vaporizing 19% and 29% $NH_4OH$. Additional carrying fluid may be needed for injection and/or dispersion requirements.

| Pounds of air per pound of $NH_4OH$ @ 68° | | |
|---|---|---|
| Carrying Fluid Temperature (° F.) | $NH_4OH$ (19 wt %) | $NH_4OH$ (29 wt %) |
| 250 | 135.2 | 77.1 |
| 300 | 50.6 | 28.8 |
| 350 | 31.0 | 17.7 |
| 400 | 22.4 | 12.7 |
| 450 | 17.5 | 9.9 |
| 500 | 14.3 | 8.2 |

Further, by heating the ammonia alone, the temperature of the carrying fluid can be relatively low, e.g., without limitation, slightly above the combined ammonia/carrying fluid mixture's dew point, which in turn significantly reduces the amount of energy used. Due to lower energy demands, equipment size can be minimized, thereby providing an additional benefit where space constraints exist. Thus, the present invention offers several advantages over the prior art system.

The following examples are intended to illustrate, but not to limit, the scope of the invention and to further explain the advantages of the current invention over the prior art.

Prior Art

To remove 90% of $NO_x$ (i.e., from 30 ppmvd to 3 ppmvd) for a typical 750 hp industrial saturated steam boiler, the ammonia flow requirement using a 19 wt % $NH_4OH$ is approximately 2.5 lbs/hr. The heat of vaporization for this flow rate is approximately 2,110 Btu/hr assuming the initial temperature of the $NH_4OH$ is 68° F.

The rate of flow of the carrying fluid for this size of boiler varies and is a function of the AIG design and the location at which it is installed. For this example, it is arbitrarily assumed to be 560 lb/hr. The resulting dew point for this mixture is 62° F. if air at 70° F. is used as the carrying fluid.

The prior art practice requires the carrying fluid (in this example, air) to be preheated to or above approximately 350° F. before spraying the liquid $NH_4OH$ into the hot air stream to vaporize the liquid. The resulting $NH_4OH$/air mixture temperature at the vaporizer exit is estimated to be approximately 330° F. Without taking into account heater efficiency or heat lost to the surroundings, the energy required for this prior art embodiment to heat the carrying fluid and vaporize the $NH_4OH$ is approximately 38,000 Btu/hr.

Example 1

According to an embodiment of the present invention, 150 psig saturated steam is used to heat the same amount of $NH_4OH$ and carrying air as above, with the carrying fluid at an initial temperature of 70° F. A condensing heat exchanger is applied to vaporize the $NH_4OH$. The energy required to vaporize the 2.5 lb/hr of 19 wt % $NH_4OH$ would be approximately 2,110 Btu/hr, assuming the initial temperature of the $NH_4OH$ is 68° F. By re-directing the condensate from the heater (3) to the secondary coil (5), the temperature of the carrying air leaving the carrying air casing (8) is expected to rise from about 70° F. to about 75° F. based on heat balance calculations. To further ensure that the $NH_4OH$ vapor stays in the vapor state and does not re-condense when mixed with the carrying air, additional saturated steam may be injected into a primary heat exchanger/coil (7) downstream of the secondary heat exchanger/coil (5) to raise the temperature of the carrying air prior to mixing with the $NH_4OH$ vapor. Without taking into account heater efficiency or heat lost to the surroundings, the total energy required to vaporize the $NH_4OH$ and raise the carrying air temperature to about 120° F. would be approximately 19,000 Btu/hr. 120° F. was chosen as the carrying air temperature because 19% $NH_4OH$ remains in the gas phase at this temperature.

Example 2

According to another embodiment of the present invention, the condensate generated in the primary heat exchanger/coil (7) is redirected to the secondary heat exchanger/coil (5), thereby generating additional energy savings. Without taking into account heater efficiency or heat lost to the surroundings, the total energy required to vaporize the $NH_4OH$ and raise the temperature of the carrying fluid to about 120° F. would be approximately 16,600 Btu/hr.

A comparison of the energy required to vaporize the $NH_4OH$ prior to introduction into the AIG header for the examples listed above is summarized in Table 1.

TABLE 1

| Comparison of Heat Requirement | | | |
|---|---|---|---|
| Case | Prior Art | Example 1 | Example 2 |
| $NH_4OH$ Flow, lb/hr | 2.5 | 2.5 | 2.5 |
| Initial $NH_4OH$ Temperature, ° F. | 68 | 68 | 68 |
| Inlet Carrying Air Flow, lb/hr | 560 | 560 | 560 |
| Inlet Carrying Air Temperature, ° F. | 70 | 70 | 70 |
| $NH_4OH$ Temperature @ Ammonia Heater Outlet, ° F. | N/A | 230 | 230 |
| Carrying Air Temperature @ Secondary Coil Exit, ° F. | | 75 | 86 |
| Carrying Air Temperature @ Primary Coil Exit, ° F. | 350 | 120 | 120 |
| $NH_4OH$/Carrying Air Mixture Temperature @ AIG Header Inlet, ° F. | 330 | 120 | 120 |
| Estimated Energy Consumption, Btu/hr | 38,000 | 19,000 | 16,600 |

Reducing Agent Dispersion System (RADS)

One of the critical criteria to maximize both $NO_x$ removal and the utilization efficiency of the reducing agent(s) simultaneously in a catalytic process is the uniformity of mixing between the reducing agent(s) and $NO_x$ in the flue gas stream.

For industrial boiler applications, the $NO_x$ concentration distribution in the flue gas stream is generally considered to be rather uniform. The reducing agent dispersion system is responsible for providing the minimum required mixing uniformity between the reducing agent(s) and $NO_x$ in the flue gas stream before it reaches the catalyst surfaces. The ammonia injection grid discussed above is just one example of a reducing agent dispersion system.

FIGS. 2a and 2b present diagrams of embodiments of a reducing agent dispersion system (RADS) to be used in conjunction with ammonia vapor as described above or with other $NO_x$ reducing agent(s) vapor, for example, but not limited to ethanol or $U_2A$, where U represents urea and A represents ammonia, for use in industrial boiler applications. $U_2A$ is formed by generating a gaseous mixture containing ammonia from dry solid urea or a urea in water solution. The balance of the mixture is water vapor and carbon dioxide. The RADS of the current invention can be used with a reducing agent that is vaporized prior to contacting it with the carrying fluid or it can also be used when the carrying fluid is used to vaporize the reducing agent. The RADS can also be applied to furnaces. The RADS of the current invention can also be used with any other process that requires the dispersion of a gaseous substance or substances into another fluid stream.

By way of example, a gaseous mixture of ammonia/carrying fluid is fed to the main RADS header (20) and is subsequently distributed to a number of lances (22). The header is coupled to the lances, meaning that the header is connected either directly or indirectly to the lances. By way of example and without limitation, additional components may separate the header from the lances. The RADS is preferably installed in an exhaust duct between the boiler exit (for either top and/or side flue gas discharge configurations) and the stack or economizer inlet.

In general, boiler exit configuration and geometry for industrial boiler applications can be either top and/or side discharge. The configuration and geometry are dictated by the way in which the convective pass is designed and arranged as would be known to one of ordinary skill in the art.

Top discharge is commonly found in furnaces and firetube steam boilers in which a circular discharge configuration (flanged) is installed at one end and at the top of the boiler and can be directly and readily connected to a circular stack. If an economizer is prescribed and is needed to extract additional heat from the exiting combustion products, a relatively short length of duct may be used to connect the boiler exit flange to the economizer inlet flange. After the combustion products pass through the economizer, they exit through a stack connected to the economizer outlet.

For large steam boilers, such as the watertube class, boiler discharge configuration typically is rectangular in shape and can be configured for either top discharge or side discharge. A-type and O-type boilers generally have top discharge while side discharge is the standard for all D-type boilers. This invention works with any type of boiler.

In one embodiment, the RADS is intended to cover substantially the entire cross-sectional area of the exhaust duct. In other embodiments, the RADS may cover less than the entire cross-sectional area of the exhaust duct as long as there is sufficient distribution of the reducing agent to reduce $NO_x$ sufficiently. In one embodiment, the reducing agent dispersion system comprises a plurality of substantially parallel lances which are preferentially positioned substantially perpendicular to the flue gas flow direction. The lances, however, need not be substantially perpendicular to the flue gas flow direction, but can be arranged at varying angles. While it is preferred that the lances are parallel to each other, they may be arranged in any configuration. For example, the lances can be arranged in the form of star or a radial outward configuration with a common header in the center for use in a circular duct. Each lance contains at least one opening (24) along the length of the lance. Preferably, each lance contains multiple openings, which preferably extend across the entire length of the lance, which in turn preferably extends across the width of the exhaust duct. These openings may be positioned substantially perpendicular to the flow direction of the flue gas stream or substantially parallel to the flow direction of the flue gas stream, or a direction in between. The openings can also be positioned to face into the flow direction of the flue gas stream, however, this configuration may lead to plugging of the openings. The openings can also be positioned to face in more than one direction. For example, one opening may be positioned substantially perpendicular to the flow direction of the flue gas stream and another may be positioned substantially parallel to the flow direction of the flue gas stream.

In an embodiment featuring parallel lances for industrial boiler applications, such as in FIGS. 2a and 2b, the lances should be about 4 to about 16 inches (centerline-to-centerline) apart. The preferred distance is about 8 to about 12 inches. The number of openings for each lance varies and is a function of the length of the lance. The longer the lance, the greater the number of openings. The minimum distance between openings (centerline-to-centerline) is about 4 inches. The preferred distance is between about 6 to about 8 inches.

The size of the openings is a function of a number of factors. One of the governing factors is the individual jet momentum ratio between the reducing agent/carrying fluid mixture and the flue gas stream. The jet momentum ratio is a function of the opening orientation with respect to the bulk flow of the flue gas stream. The typical jet momentum ratio for a co-flow arrangement at full load operating conditions is in the range of about $5.0 \times 10^{-6}$ to about $5.0 \times 10^{-3}$, whereas for a cross flow arrangement under full load operating conditions, the typical jet momentum ratio is in the range of about $8.0 \times 10^{-6}$ to about $1.0 \times 10^{-2}$. Furthermore, reducing agent fluid pressure loss across the opening is in the range of about 2 to about 10 inches of water column. Any currently available computer-aided-design (CAD) or computational fluid dynamics (CFD) tools may be used to assist in determining the proper size of the openings. Other factors which affect the size of the openings are known to one of skill in the art.

According to an embodiment of the present invention, the RADS is housed in one end of a duct with the same cross-sectional area as the RADS. This duct may incorporate a plurality of flow deflecting vanes (26) as shown in FIG. 3. The vanes help to facilitate mixing of the reducing agent/carrying fluid mixture with the flue gas. The vanes may be angled randomly to the direction of the flue gas flow. The physical height of the vanes is about 3 to about 16 inches. The physical length of the vane plays an important role in finalizing the mixing of the reducing agent and flue gas. The desirable length of the vanes is from about 2 to about 4 times the physical height of the vane. The vanes are located downstream of the RADS. The minimum length of RADS housing duct is boiler specific and thus varies. In general, it can be expressed as a function of gas residence time. Generally, the longer the length of the housing duct, the greater the residence time. The gas residence time required within the housing duct between the RADS and the inlet opening of the reactor casing (51) when using the RADS is between about 0.1 to about 2.0 seconds. The preferred gas residence time is between about 0.2 to about 0.5 seconds.

Reactor Design
Prior Art Reactor Design

A prior art catalytic bed consists of one or more parallel flat catalytic holders in which the catalytic bed(s) occupies the entire cross-sectional area of a reactor in the direction of the flow stream. In general, the flat catalytic holder is installed perpendicular to the flow stream and the channels or passages of all catalyst elements are positioned parallel to the direction of the bulk flow.

The catalyst holder serves as a structural support to secure and house the catalyst proper in the form of cassettes or elements, and can be positioned horizontally, vertically or at an angle within the reactor duct.

Each catalyst holder is formed by a number of cassettes, which in turn, are formed by a number of individual catalyst elements. The catalyst elements can be supported by a ceramic or metallic substrate. The catalyst elements can be of honeycomb-structure block whose hydraulic diameter can vary between about 0.028 inches to about 0.185 inches. The thickness of the catalyst elements can be in the range of about 2 to about 24 inches. The thickness of the catalyst elements varies to suit the overall catalyst volume required to perform the desired $NO_x$ conversion. The NOx conversion for a given catalyst formulation is determined by the total catalyst volume together with the gas temperature. The thickness of the catalyst elements aids in distributing the required catalyst volume. The thickness of the catalyst elements will have an effect on the pressure drop across the catalyst elements. Thus, a specific thickness can be chosen to produce a balanced pressure drop. However, the thickness of an individual catalyst element must have a minimum thickness in order to achieve the target performance.

The volume of the catalyst elements in all of the catalyst holders of the reactor is greater than or equal to the volume required for the $DeNO_x$ process. The $DeNO_x$ process is also referred to as the denitrization process.

Hot flue gas containing $NO_x$ is mixed with sufficient reducing agent(s) and is introduced into the reactor casing transition duct. As it passes through the channels of the catalyst elements and comes in contact with the catalyst proper, denitrization or $DeNO_x$ process takes place. Reaction products then leave the catalyst elements and exit the reactor casing.

New Reactor Design

FIG. 4a represents an alternate reactor design. Its main features are the catalyst holder (40) and the reactor casing (41). FIG. 4c represents a cross section of the catalyst holder. The catalyst holder comprises a first end (42), a second end (44), an interior wall (46), an exterior wall (48), and a center (50). The first end is open, the second end is closed and the center is hollow. The reactor casing comprises an inlet (43), an outlet (45), an inner wall (47), and an outer wall (49), wherein the inlet has an opening (51) to allow a flue gas mixture to enter the center of the catalyst holder and the outlet has an opening (53) to allow a flue gas mixture to exit the reactor. A flue gas mixture is defined as comprising one or more of the following: flue gas, reducing agent(s), carrying fluid, reaction products, and nitrogen oxides. The components of the flue gas mixture vary depending upon where the flue gas mixture is in the reactor and what reactions have occurred or are occurring.

The catalyst holder serves as a structural support to secure the catalyst proper in the form of cassettes or elements. The catalyst elements are installed as the walls of the catalyst holder which can be in the shape of any hollow regular polygon of n-sides. The lower the value of "n," the larger the exposed surface area per a fixed contained gas passage volume. This rule applies to any regular polygon in which all sides have the same length. For simplicity purposes, in some embodiments, a regular polygon of 3 to 8 sides can be used. Alternatively, if the boiler exit geometry is rectangular in shape, a rectangular catalyst holder may be used to simplify the transition duct design. The channels or passages of the catalyst elements are positioned substantially perpendicular to the direction of the incoming un-treated flow. As indicated above, the hollow n-sided polygon catalyst holder has one end open and the other end completed sealed or closed. Hot flue gas containing $NO_x$ which is mixed with sufficient reducing agent(s) is introduced into the hollow center passage (50) at the base or the open end (42) of the catalyst holder. Because the second end (44) of the catalyst holder is closed, the flue gas mixture is forced through the channels of the catalyst elements where denitrization or the $DeNO_x$ process takes place. A flue gas mixture containing reaction products then leaves the catalyst elements and enters the space (55) between the exterior wall (48) of the catalyst holder and the inner wall (47) of the reactor casing. The flue gas mixture containing reaction products then exits the reactor through the outlet opening (53).

In another embodiment, depicted in FIG. 4b, the flow process can be reversed. Hot flue gas containing $NO_x$ which is mixed with sufficient reducing agent(s) is introduced at the closed end (44) of the catalyst holder. Because the flue gas mixture cannot enter the hollow center (50) passage of the catalyst holder, the mixture is forced to flow through the channels of the catalyst elements from the surrounding space (55) between the exterior wall (48) of the catalyst holder and the inner wall (47) of the reactor casing into the hollow center (50) of the catalyst holder. The flue gas mixture containing reaction products then exits the catalyst holder through the open end (42) of the catalyst holder. The flue gas mixture containing reaction products then exits the reactor through the outlet opening (53).

The shape of the reactor casing as well as the shape of the catalyst holder can vary. For example, they can be square, rectangular, cylindrical or any other geometric shape according to the physical constraints present at the job site. The catalyst holder and reactor casing do not need to be in the same shape. In a preferred embodiment, the reactor casing is cylindrical due to its relatively low fabrication cost. An objective is to use the least amount of metal to house the catalyst holder while minimizing connecting duct transitions between the reactor casing and its inlet/outlet ducts. The shape of the catalyst holder and/or reactor casing is designed to suit the physical limitations or space constrains of the specific boiler.

A cross section of a catalyst holder is depicted in FIG. 4c. While four walls are shown, the catalyst holder can be in the shape of any hollow regular polygon of n-sides. Each wall of the catalyst holder is formed by a number of cassettes, which in turn, are formed by a number of individual catalyst elements. A photograph of an embodiment of the catalyst elements is contained in FIG. 5. The catalyst elements can be of honeycomb-structure block whose hydraulic diameter can vary between about 0.028 inches to about 0.185 inches. The catalyst elements can be in any shape known in the art. The thickness of the catalyst elements which form the walls of catalyst holder can range from about 2 to about 24 inches. The width (57) of each wall is a function of the area of the hollow center passage (inscribed circle (58)) which is surrounded by the walls. In FIG. 4a, the diameter of the inlet opening (51) dictates the diameter of the inscribed circle. In general, the inscribed circle area or the cross-sectional area of the center passage (in the case of a rectangular duct) shall be equal to or larger than the corresponding boiler exit cross-sectional area.

The design of the catalyst holder begins with the selection of a minimum catalyst volume needed to satisfy the specific $NO_x$ removal or conversion requirements. The determination of the volume required can be done through kinetic modeling of a specific catalyst formulation. The total volume required to perform the necessary $DeNO_x$ process is less than or equal to the catalyst volume of each wall times the number of walls that compose the hollow n-sided polygon. Once the minimum overall volume is known and the center passage area is determined and selected, the next step is to determine the desired pressure loss across the catalyst holder by combining the three remaining parameters, namely, the thickness of the catalyst elements to be used, the number of walls and therefore the geometric shape of the catalyst holder, and the length or height of the catalyst holder.

The geometric shape and size of the reactor casing can be chosen according to the desired pressure loss along with the physical and space constraints of the specific boiler application. In general, the range of pressure loss across the entire reactor is about 0.5 to about 6 inches, preferably, between about 1.5 and about 3 inches of water column. Pressure loss across the catalyst holder alone should be designed to be in the range of about 0.5 to 1.0 inches of water column.

The reactor of the current invention offers cost advantages over the prior art reactor. Cost savings result primarily from a decrease in construction costs. The reactor of the present invention provides a substantial reduction in the size of the inlet transition duct which extends from the boiler exit to the reactor casing. Likewise, the size of the exit transition duct is reduced. This extends from the outlet of the reactor casing to a downstream device such as an economizer or a stack. Furthermore, because the size and weight of the transition ducts is reduced, the associated support structures for these ducts are also minimized. The actual amount of cost savings will be case specific.

This reactor can be used to treat all pollutants in combustion products as a result of firing any fossil fuel that requires the use of one or multiple catalysts. For example, the reactor of the present invention can be used to reduce CO and VOC in a flue gas stream when an oxidation catalyst is installed in the catalyst holder. In this example, neither the vaporizing method of the invention nor the RADS will be needed since the oxidation process does not require the assistance of a reducing agent.

The present invention may be embodied in other specific forms without departing from its essential characteristics. The described embodiment is to be considered in all respects only as illustrative and not as restrictive. The scope of the present invention is, therefore, indicated by the appended claims rather than by the foregoing description. All changes which come within the meaning and range of the equivalence of the claims are to be embraced within their scope.

What is claimed is:

1. A method for selective reduction of nitrogen oxides in a gas stream with ammonia, wherein the gas stream comprises nitrogen oxides, the method comprising:
    a) vaporizing the ammonia in a heater, wherein the vaporizing uses steam and wherein the steam produces a condensate in said heater;
    b) directing the condensate from said heater to a secondary heat exchanger/coil mounted in a casing containing a carrying fluid and heating the carrying fluid with the secondary heat exchanger/coil;
    c) contacting the vaporized ammonia with the heated carrying fluid;
    d) mixing the vaporized ammonia with the heated carrying fluid; and
    e) exposing the mixture of the vaporized ammonia and the heated carrying fluid to the gas stream for selective reduction of nitrogen oxides; and
    wherein a, b, c, d, and e occur in order.

2. The method of claim 1 wherein the ammonia is in an aqueous solution before the vaporizing.

3. The method of claim 2 wherein the ammonia is present at a concentration of about 29.4% by weight before the vaporizing.

4. The method of claim 2 wherein the ammonia is present at a concentration of about 19% by weight before the vaporizing.

5. The method of claim 1 wherein the carrying fluid is ambient air.

6. The method of claim 1 wherein the carrying fluid is flue gas.

7. The method of claim 1 wherein the vaporized ammonia is above about 120° F. during the contacting.

8. The method of claim 1 further comprising raising a temperature of the carrying fluid with a heat source prior to the mixing.

9. The method of claim 1, wherein the method further comprises, before step (b) of directing the condensate from said heater to a secondary heat exchanger/coil mounted in a casing containing a carrying fluid and heating the carrying fluid with the secondary heat exchanger/coil, the step of:
    heating the carrier fluid, wherein the heating uses a heat source.

10. The method of claim 9, wherein the heat source for heating the carrier fluid is a low pressure waste steam.

11. The method of claim 9, wherein the heat source for heating the carrier fluid is hot flue gas.

12. The method of claim 9, wherein the heat source for heating the carrier fluid is an electric heater.

13. A method for selectively reducing nitrogen oxides in an exhaust gas comprising:
    (a) indirectly heating aqua ammonia in a heater with a heating fluid comprising steam, wherein the steam is not mixed with the ammonia, to produce in said heater vaporized ammonia and a residual fluid of said heating fluid, wherein said residual fluid comprises steam, condensate, or mixtures thereof;
    (b) directing said residual fluid from said heater to a secondary heat exchanger/coil and indirectly heating a carrier gas with said residual fluid to produce a heated carrier gas;
    (c) mixing the vaporized ammonia with said heated carrier gas to produce a reducing agent; and
    (d) contacting the reducing agent with the exhaust gas to selectively reduce at least a portion of the nitrogen oxide.

14. The method of claim 13 wherein said residual fluid is steam condensate.

* * * * *